3,000,210
METER FOR LIQUIDS
Jean Faure-Herman, 68 Rue de l'Est,
Boulogne-sur-Seine, France
Filed Sept. 6, 1955, Ser. No. 532,556
Claims priority, application France Sept. 18, 1954
6 Claims. (Cl. 73—231)

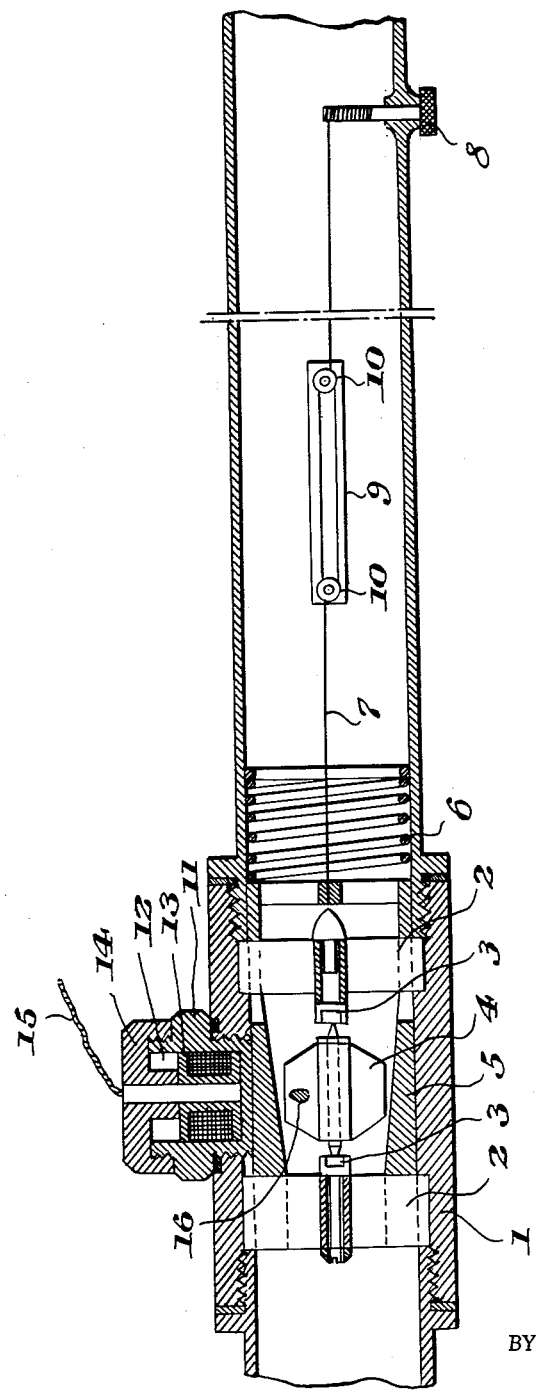

This invention relates to a meter for liquids enabling mass deliveries to be measured.

Actually, it is known that quite frequently users are concerned wtih ascertaining the weight of the liquid utilized, and not its volume. In this case, if we are satisfied with graduating a volumetric meter for liquid by weight and not by volume, an error is introduced, as the density of the liquid varies according to its nature and according to the temperature at which it exists.

The aim of this invention is to obviate thas disadvantage.

To this end, it relates to a meter for liquid comprising a turbine such as a propeller revolving at a speed in proportion to the delivery by volume of the liquid, this meter being characterized by means for causing the section of the turbine nozzle to vary in relation to the density of the liquid and various external factors intervening on the value of this density such as the temperature, this arrangement enabling the speed of the turbine to be modified in relation to the density of the liquid, which enables the mass value of the delivery of the liquid to be ascertained.

According to one form of embodiment, the turbine is placed in a tapering nozzle, whereas means ensure the relative displacement of the turbine and nozzle so as to regulate the section of the nozzle in front of the turbine to a value corresponding to the density of the liquid whose mass delivery is required to be measured.

According to another form of embodiment, the means of adjusting the section of the turbine nozzle are, on the one hand, adjustable by hand in relation to the density of the liquid at a reference temperature, and on the other hand, automatically in relation to the variation of temperature as compared with the reference, for taking into account the variation of the density of the liquid in relation to the temperature.

The invention also relates to the characteristics hereinafter described and to their various possible combinations.

A meter for liquid according to the invention is shown by way of example in section elevation in the sole accompanying figure.

In the meter according to the invention the volumetric delivery measurement takes place by counting the revolutions of the propeller 4. Each revolution of said propeller 4 corresponds to the passage of a volume V of liquid equal to a cylinder whose length is given by the pitch $p$ of the propeller, and the diameter $\phi$ of the section is that of the nozzle 5 within which propeller 4 rotates.

$$V = p\phi = \text{recording unit volume}$$

If the density $d$ were constant, to record by weight, it would only be necessary, instead of taking V, to take a recording unit weight such as:

$$P = p \times \phi \times d = C^{te}$$

Now, as $d$ is variable, for the weight P to be constant, the device enables the diameter $\phi$ to be made inversely proportional to the density $d$.

For this, according to the invention, the diameter $\phi$ of the nozzle 5 is varied, by a diaphragm, for example, or else an embodiment given by way of example consists of utilizing a nozzle 5 that is tapered instead of cylindrical. The propeller 4 being maintained by bearings 3 attached to the outside covering 1 of the apparatus. The tapering nozzle 5 is able to move in a longitudinal direction with regard to this propeller 4, so as to vary the diameter of the flow section at right angles with the propeller.

This arrangement enables:

(1) A previous adjustment to be made, according to the nature of the liquid to be measured, in other words, according to the specific weight at a basic temperature. This adjustment would be operated by the user.

(2) An automatic adjustment to be made, according to the variation of the specific weight with temperature changes. This adjustment would be automatically made by thermometric control. It could be achieved electrically with a servo-motor, or else by means of a mercury or steam pressure thermometer, or with a wire of known dilatation coefficient, these forms of embodiment being given by way of non-restrictive example.

Thus, in this manner, the correction is made not only on the totality of the recording units but also on their passage frequency, i.e., on the speed of the flow.

The meter shown by way of example in the sole figure consists of a body 1 which comprises braces 2 at both ends, maintaining the bearings 3 of the propeller 4 which is activated by the liquid current and revolves at a speed in proportion to the volumetric delivery of the liquid.

A tapering nozzle 5 slotted opposite said braces can move longitudinally in both directions with regard to the propeller 4 and the body 1.

A recoil spring 6 effects a constant pressure on the nozzle tending to return the nozzle towards one of its end positions.

A metal wire 7 is attached by one end to the nozzle 5 and by the other to an adjustment screw 8 accessible to the user.

The wire 7 is plunged into the liquid to be measured, for its entire length.

To carry out the previous adjustment of the position of the tapering nozzle 5 with regard to the propeller, the user turns the knob 8 up or down, of the adjustment screw.

Automatic correction in relation to temperature is made by the lengthening or shortening of the wire 7 which is plunged in the liquid in response to the changes of liquid temperature.

The elongations of the wire 7 being small, the wire 7 requires to be of great length so that the displacements of the cone are appreciable.

To this end, the wire 7 is wound on a carrier 9 made of material that does not easily stretch (wood for example), provided with a certain number of pulleys 10 which facilitates the sliding of the wire 7. The entire assembly is plunged into the liquid.

Suitable means may be utilized to measure the number of rotations of the turbine 4. One such means is shown in the accompanying drawing as a plug 11 inserted in the casing 1 of the meter, the plug having a recess 12 therein. Positioned within the recess is a winding 13 held in place by a cap 14 fitted over the plug 11. A lead 15 extends from the winding through the cap and may be attached to a device for measuring pulses of current and counting them. A piece of magnetic material 16 is placed in one of the blades of the turbine 4.

Thus, each time the turbine makes one rotation, the piece of magnetic material 16 will create a disturbance of the winding which will create a pulse of current which is counted by the pulse counting means. The pulse counting means may be calibrated to be read directly in the units of liquid being measured.

What I claim is:

1. In a liquid meter the combination comprising a body through which the liquid passes, a conical nozzle slidably mounted in said body for sliding movement axially of said nozzle and said body, a turbine rotatably mounted coaxially in said nozzle, means fixed on said body on which said turbine is mounted for fixing said turbine to keep it axially immovable in said body, tension means connected to said nozzle for displacing it axially in one direction in said body for changing the cross section of the passage for the liquid in said turbine, and spring means between said body and said nozzle urging said nozzle in the opposite direction from said tension means into one of its end positions, said tension means and said spring means together regulating the position of said nozzle.

2. In a liquid meter the combination comprising a body through which the liquid passes, a conical nozzle slidably mounted in said body for sliding movement axially of said nozzle and said body, a turbine mounted coaxially in said nozzle, braces fixed respectively at each of the ends of said body, bearings mounted on said braces and on which said turbine is rotatably mounted, a wire having one end connected to said nozzle, and a shaft rotatably mounted on said body and accessible from outside of said body to which the other end of said wire is connected for displacing it axially in said body, and spring means between said body and said nozzle urging said nozzle into one of its end positions against the action of said wire.

3. In a fluid meter the combination comprising a body through which the fluid passes, a conical nozzle slidably mounted in said body for sliding movement axially of said nozzle and said body, a turbine rotatably mounted coaxially in said nozzle, means fixed on said body on which said turbine is mounted for fixing said turbine to keep it axially immovable in said body, spring means between said body and said nozzle urging said nozzle into one of its end positions, and means responsive to the temperature of the fluid circulating in said body placed in said body to be contacted by the fluid and comprising wire the length of which is a function of the fluid temperature, means connecting said wire to said conical nozzle for transmitting the displacements in said wire to the conical nozzle in the direction opposite to the action of said spring, said temperature responsive means and said spring together regulating the cross section of the passage for the fluid past the turbine as a function of the temperature.

4. In a liquid meter the combination comprising a body through which the liquid passes, a conical nozzle slidably mounted in said body for sliding movement axially of said nozzle and said body, a turbine rotatably mounted coaxially in said nozzle, means fixed on said body on which means said turbine is mounted for fixing said turbine to keep it axially immovable in said body, spring means between said body and said nozzle urging said nozzle into one of its end positions, a temperature responsive apparatus positioned in said body to be immersed in the liquid circulating in said body and comprising a metallic wire the length of which varies with temperature, one end of said wire being fixed to said nozzle, a regulating element fixed upon said body having a screw accessible from the exterior of the meter, the other end of said wire being fixed to said regulating element, whereby said nozzle slides axially in one direction or the other as a function of the temperature, said wire being held taut by the action of said spring means.

5. In a liquid meter the combination comprising a body through which the liquid passes, a conical nozzle slidably mounted in said body for sliding movement axially of said nozzle and said body, a turbine rotatably mounted coaxially in said nozzle, means fixed on said body on which means said turbine is mounted for fixing said turbine to keep it axially immovable in said body, spring means between said body and said nozzle urging said nozzle into one of its end positions, a temperature responsive apparatus positioned in said body to be immersed in the liquid circulating in said body and comprising a metallic wire the length of which varies with temperature, one end of said wire being fixed to said nozzle, a regulating element fixed upon said body having a screw accessible from the exterior of the meter, the other end of said wire being fixed to said regulating element, whereby said nozzle slides axially in one direction or the other as a function of the temperature, said wire being held taut by the action of said spring means, and a carrier on which a portion of the length of said wire longer than said carrier is wound, said carrier being positioned between said regulating element and said nozzle.

6. In a liquid meter the combination comprising a body through which the liquid passes, a conical nozzle slidably mounted in said body for sliding movement axially of said nozzle and said body, a turbine rotatably mounted coaxially in said nozzle, means fixed on said body on which means said turbine is mounted for fixing said turbine to keep it axially immovable in said body, spring means between said body and said nozzle urging said nozzle into one of its end positions, a temperature responsive apparatus positioned in said body to be immersed in the liquid circulating in said body and comprising a metallic wire the length of which varies with temperature, one end of said wire being fixed to said ing a screw accessible from the exterior of the meter, the other end of said wire being fixed to said regulating element, whereby said nozzle slides axially in one direction or the other as a function of the temperature, said wire being held taut by the action of said spring means, and a carrier on which a portion of the length of said wire longer than said carrier is wound, said carrier being positioned between said regulating element and said nozzle and comprising two spaced pulleys around which said wire is wound.

References Cited in the file of this patent

UNITED STATES PATENTS

| | | |
|---|---|---|
| 884,491 | Hiersing | Aug. 14, 1908 |
| 2,270,141 | Potter | Jan. 13, 1942 |
| 2,709,366 | Potter | May 31, 1955 |
| 2,772,567 | Boden et al. | Dec. 4, 1956 |

FOREIGN PATENTS

| | | |
|---|---|---|
| 106,805 | Switzerland | Sept. 16, 1924 |

UNITED STATES PATENT OFFICE
CERTIFICATE OF CORRECTION

Patent No. 3,000,210                            September 19, 1961

Jean Faure-Herman

It is hereby certified that error appears in the above numbered patent requiring correction and that the said Letters Patent should read as corrected below.

Column 4, after line 40, insert -- nozzle, a regulating element fixed upon said body hav- --.

Signed and sealed this 13th day of April 1965.

(SEAL)
Attest:

ERNEST W. SWIDER                                 EDWARD J. BRENNER
Attesting Officer                                       Commissioner of Patents